United States Patent [19]

Furuta

[11] 4,331,307
[45] May 25, 1982

[54] EARLY TAPE END ALARM FOR A MULTISPEED TAPE RECORDER

[75] Inventor: Kenzi Furuta, Hachioji, Japan

[73] Assignee: Olympus Optical Co., Ltd., Tokyo, Japan

[21] Appl. No.: 137,290

[22] Filed: Apr. 4, 1980

[30] Foreign Application Priority Data

Apr. 14, 1979 [JP] Japan .................. 54-45555

[51] Int. Cl.³ .............. B65H 59/38; G03B 1/04; G11B 15/32
[52] U.S. Cl. .................. 242/186; 360/74.2
[58] Field of Search .............. 242/186–188, 242/190, 191, 201; 116/114 J; 360/71, 73, 70, 74.1, 74.2; 340/675; 318/6, 7

[56] References Cited

U.S. PATENT DOCUMENTS

| | | | |
|---|---|---|---|
| 3,600,654 | 8/1971 | Yasutake | 318/6 |
| 3,730,453 | 5/1973 | Hotchkiss et al. | 242/191 |
| 3,913,519 | 10/1975 | Sugano | 116/114 J |
| 4,213,583 | 7/1980 | Mitani et al. | 242/186 |

Primary Examiner—Leonard D. Christian
Attorney, Agent, or Firm—Frishauf, Holtz, Goodman & Woodward

[57] ABSTRACT

An early tape end alarm for a multispeed tape recorder has a hub around which a tape is wound and which revolves at the speed corresponding to an amount of tape wound therearound, a first pulse generating means for generating a first pulse (P1) with a period changing in accordance with the rotary speed of the hub, and an alarm means which compares a value (CD) corresponding to the period of the first pulse (P1) with a given value (PD) thereby to give an alarm to notify that a traveling tape will reach its tape end in a short-time on the basis of the result of the comparison. The early tape end alarm is characterized by a means for changing a condition to provide the comparison result in the alarm means in accordance with the tape traveling speed for determining the timing of the generation of the alarm substantially independent of a traveling speed of the tape.

9 Claims, 12 Drawing Figures

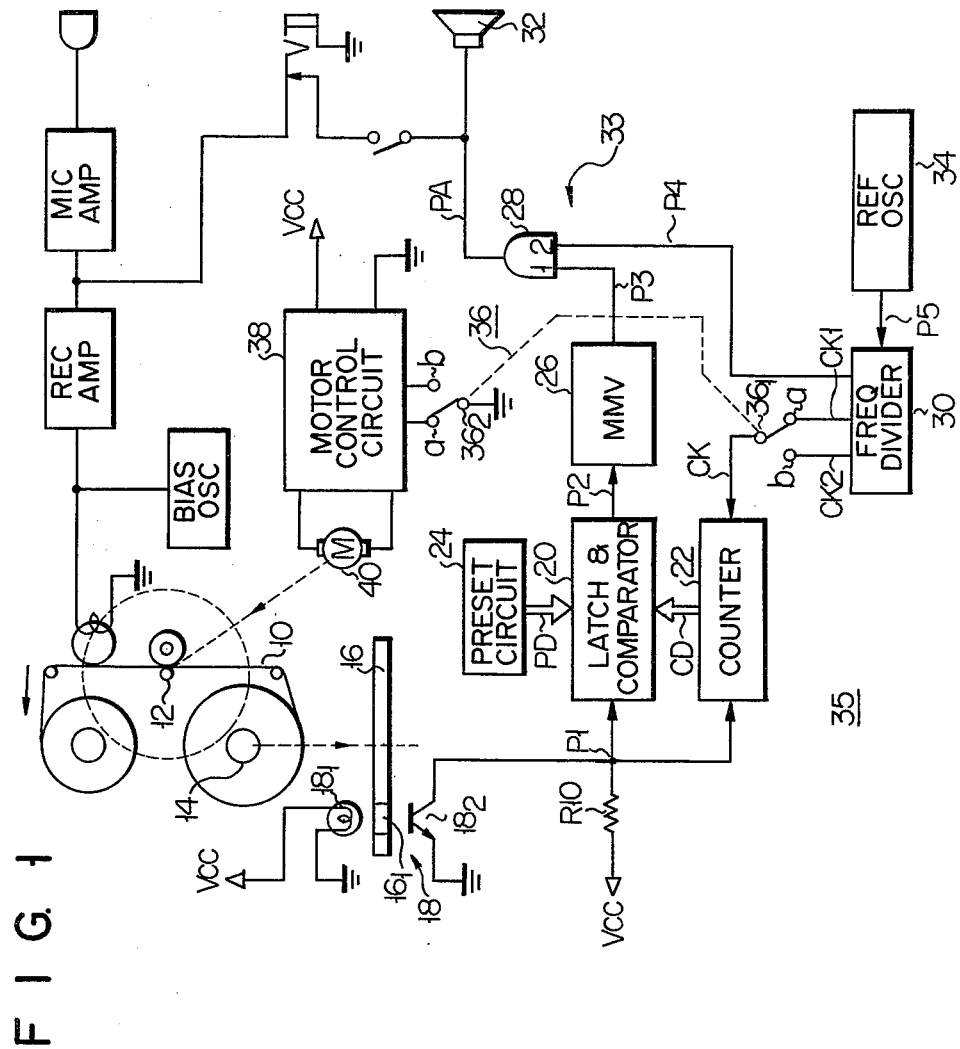
F I G. 1

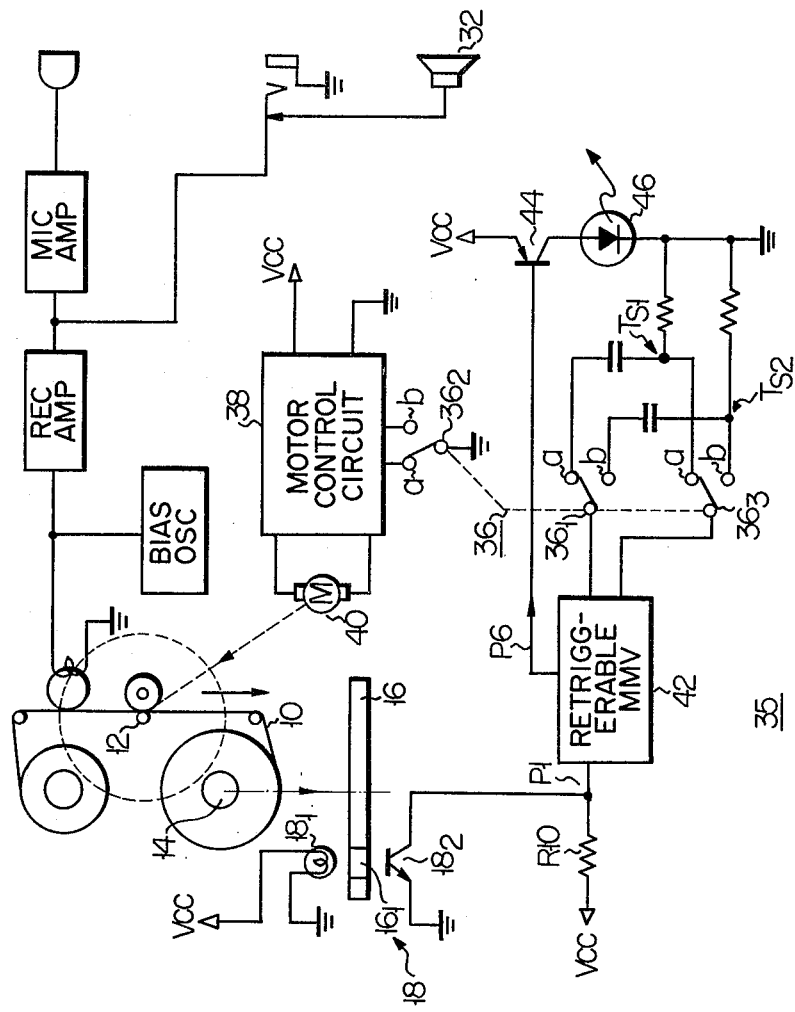
F I G 3

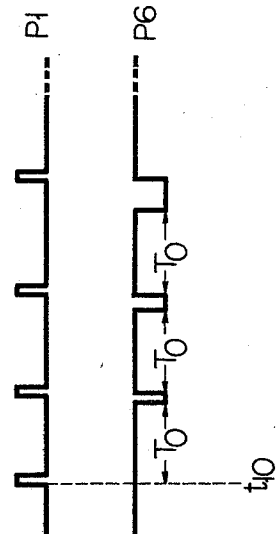
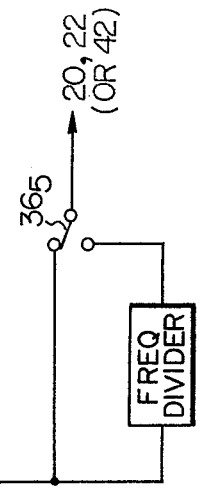
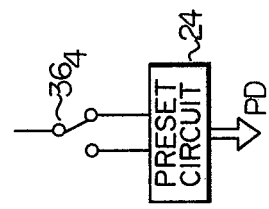
F I G. 4A
F I G. 4B
F I G. 5
F I G. 6

EARLY TAPE END ALARM FOR A MULTISPEED TAPE RECORDER

BACKGROUND OF THE INVENTION

The present invention relates to an early tape end alarm for a multispeed tape recorder for giving an alarm to notify the immediate arrival of the tape end of a traveling tape before the tape end is reached.

It is desirable that an operator can previously know the end of a tape travel before the tape completes its travel. For example, in a case where a long time record is performed, if the apparatus issues an advance notice that the currently traveling tape will end in five minutes, the operator can prepare for the tape exchange before the tape running ends. Accordingly, a recording error due to a time required for tape exchange is minimized. If the notice is not issued, the operator frequently fails to find the timing of the tape exchange until the tape running terminates. If the remnant of the tape wound up by a hub is always observed, the tape exchange timing may be caught previously. Such an observation, however, is difficult or impractical.

One of the conventional early tape end alarm is used in a PHILLIPS type cassette tape recorder now marketed in Japan. In this known tape end alarm system, electric signals produced corresponding to a rotary speed of a reel shaft are compared with a given value. When those coincide with each other, an LED display is flashed. The given value is preset in accordance with a length of a tape used. Such a tape end alarm is useful for a case where it is used in a tape recorder operating with a single tape speed, such as the cassette tape recorder of the PHILLIPS type.

The conventional early tape end alarm is unfavorable for a tape recorder operable with two speeds like a microcassette type tape recorder. Let us consider a case where the given value is preset to five minutes before the tape end when the conventional device is used under an operating condition of 2.4 cm/s for the tape speed. In this case, when the tape speed is changed to 1.2 cm/s without changing the given value, the tape end alarm operation often fails, or the alarm is given immediately before the tape end. The time appropriate for the preparation for tape exchange is independent of the tape speed. Accordingly, the timing by which the tape end alarm is issued should be desirably independent of the tape speed.

SUMMARY OF THE INVENTION

Accordingly, an object of the invention is to provide an early tape end alarm for a multispeed tape recorder of which the timing of issuing a tape end alarm is independent of the change of a tape speed.

To achieve the above object, an early tape end alarm for a multispeed tape recorder according to the invention is comprised of: a hub around which a tape is wound and which revolves at the speed corresponding to an amount of tape wound therearound, a first pulse generating means for generating a first pulse with a period changing in accordance with a rotary speed of the hub, alarm means which compares a value corresponding to the period of the first pulse with a given value to thereby give an alarm to notify that a traveling tape will reach its tape end on the basis of the result of the comparison, and a means for changing a condition to provide the comparison result in the alarm means in accordance with the tape traveling speed for determining the timing of the generation of the alarm substantially independent of a traveling speed of the tape.

With such a construction, the means for changing a condition of the alarm generation timing enables the tape end alarm to be issued at a given timing independently of a tape running speed.

BRIEF DESCRIPTION OF THE DRAWINGS

FIG. 1 is a block diagram of an embodiment of an early tape end alarm according to the invention;

FIG. 3 is a block diagram of another embodiment of the early tape end alarm according to the invention;

FIGS. 4A and 4B are timing charts for illustrating the operation of the embodiment shown in FIG. 3; and FIGS. 5 and 6 are views which show auxiliary circuits usable for the tape end alarm shown in FIG. 1.

DESCRIPTION OF THE PREFERRED EMBODIMENTS

Figure 2:
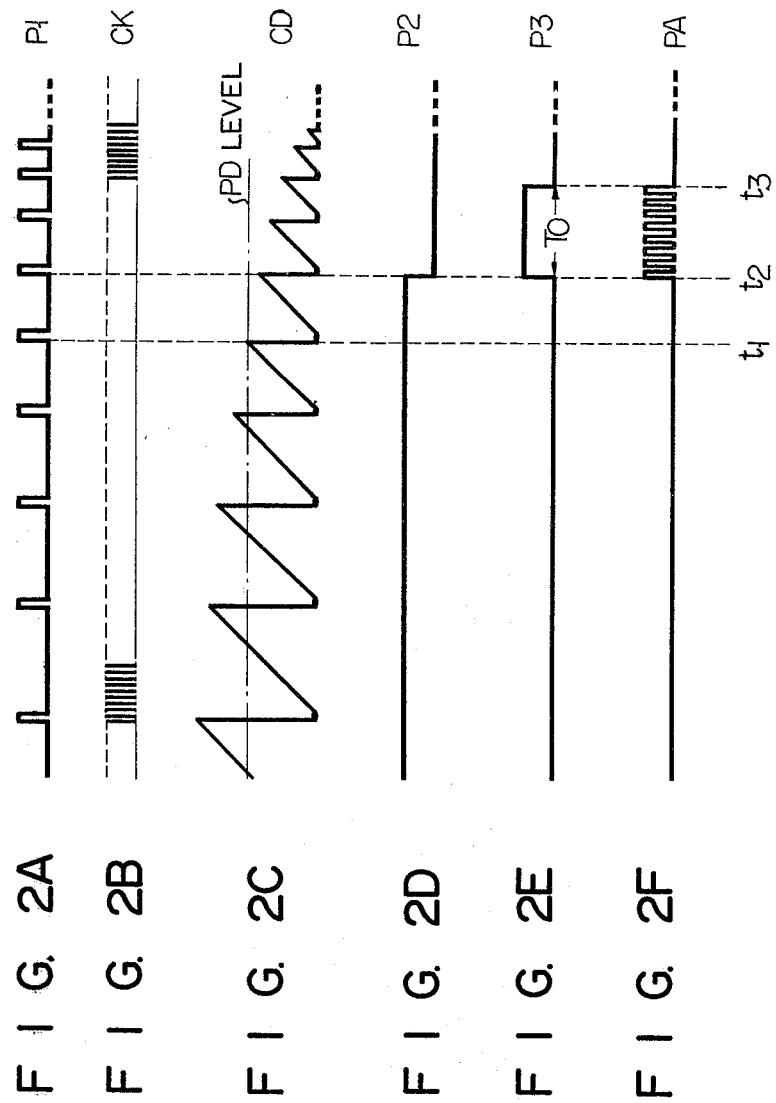
FIGS. 2A to 2F are a set of timing charts useful in explaining the operation of the apparatus shown in FIG. 1.

Preferred embodiments of an early tape end alarm according to the invention will be described in detail referring to the accompanying drawing. Throughout the drawings, like reference symbols are used to designate like or equivalent parts or portions, for simplicity of illustration and explanation.

Referring now to FIG. 1, there is shown a block diagram of an early tape end alarm according to the invention including a schematic of a tape recorder. A tape 10 travels at a constant speed, e.g. 2.4 cm/s, under drive by a capstan 12. The rotary speed of a hub 14 on the tape feed side (supply side) is inversely proportional to a diameter of the tape wound around the hub 14, that is, the remnant of the tape. A light screening disc 16 is coupled with the reel shaft (not shown) for driving the hub 14. A plurality of light-passing holes $16_1$ are disposed on the periphery of the disc 16 with equiangular regulations. A photointerrupter 18 is disposed at a fixed position so that an orbital path traced by the light passing holes $16_1$ rotating around the center of the disc 18 is put between the light path of the interrupter 18. Specifically, a light source $18_1$ is disposed above the light-passing hole $16_1$ and a photo-transistor $18_2$ is disposed under the light-passing hole $16_1$. The collector of the phototransistor $18_2$ is connected through a resistor R10 to a power source Vcc. When the light passing hole $16_1$ comes in between the light source $18_1$ and the phototransistor $18_2$, the phototransistor $18_2$ is turned on. When the disc 16 rotates to interrupt the light path of the photo-interrupter 18, a first pulse, or a gate pulse P1, is derived from the collector of the photo-transistor $18_2$. The period of the gate pulse P1 corresponds to the remnant of the tape taken up by the hub 14.

The gate pulse P1 is applied to a latch/comparator 20 and a counter 22. A preset circuit 24 applies preset data PD to the latch/comparator 20. In response to the gate pulse P1, the preset data PD is loaded into the latch/comparator 20. Count data CD from the counter 22 is further applied to the latch/comparator 20. The count data CD corresponds to second pulses input during one period of the gate pulse P1, that is, corresponds to the number of the clock pulses CK. When the count data CD is larger than the preset data PD during one period of the gate pulse P1, the output level of the latch/comparator 20 remains unchanged. With decrease of the tape remnant, the period of the gate pulse P1 becomes shorter. When PD>CD, the latch/comparator 20 produces a third pulse, i.e. a trigger pulse P2.

The trigger pulse P2 is applied to a one-shot or monostable multivibrator (abbreviated as MMV) 26. Upon receipt of the trigger pulse P2, the MMV 26 produces a second gate pulse P3 of logical "1" for a fixed period. The second gate pulse P3 is applied to the first input terminal of an AND gate 28. A frequency divider 30 applies an alarm pulse P4 of 1 KHz, for example, to the second input terminal of the AND gate 28. In response to the second gate pulse P3, the AND gate 28 allows the alarm pulse P4 to pass therethrough and to enter as an alarm signal PA to a speaker 32. Upon the generation of the trigger pulse P2, the speaker 32 produces an alarm sound of 1 KHz for a fixed time. The circuit elements 26 to 32 and 34 constitute an alarm circuit 33 and the circuit elements 20 to 34 form an alarm means 35.

A reference pulse P5 is applied from a reference oscillator 34 to the frequency divider 30. When the tape recorder shown in FIG. 1 is provided with a digital clock, for example, the frequency divider 30 and the oscillator 34 may be formed by those in the clock section. The reference pulse P5 is frequency-divided to the alarm pulse P4, a first clock pulse CK1 and a second clock pulse CK2. The first and the second clock pulses CK1 and CK2 are applied to contacts a and b of the switch $36_1$. The pulse CK1 or CK2 selected by the switch $36_1$ is applied as the clock pulse CK to the counter 22. The switch $36_1$, together with a switch $36_2$, forms a speed change switch 36 of the two-gang two-contacts type. Contacts a and b of the switch $36_2$ are coupled with a motor control circuit 38 including a servo circuit for a motor 40 to drive the capstan 12. The speed control IC, model TCA 955 manufactured by SIEMENS Co. in West Germany may be used for the control circuit 38.

The operation of the early tape end alarm shown in FIG. 1 will be described referring to FIGS. 2A to 2F. Assume that the number of the gate pulses P1 produced when the disc 16 rotates one turn is 10, and that the diameter of the tape taken up by the hub 14 is 15 mm at the tape speed of 2.4 cm/s when at the time of issuance of an alarm to notify the immediate arrival of the tape end. On this assumption, for producing an alarm before five minutes to the tape end, the period T1 of the gate pulse P1 is 0.196 second [$\cong 15\pi/(24\times 10)$]. When the frequency of the clock pulse CK (=CK1) is 10 KHz and period T1 is more than 196 ms, the count data CD is more than 1960. In this case, if the preset data PD is 510, PD<CD is obtained so that the output pulse P2 of the latch/comparator 20 becomes logical "1". The state before t1 in FIG. 2 illustrates the above-mentioned state.

When PD>CD at time t2, that is, the tape traveling is before five minutes to the tape end, the output pulse P2 of the latch/comparator 20 becomes logical "0". In other words, the trigger pulse P2 is produced at time t2. When triggered by the trailing edge of the trigger pulse P2, the MMV 26 produces the second gate pulse P3 of logical "1" with the pulse width To. When the AND gate 28 is enabled by the second gate pulse P3, the alarm signal PA is applied to the speaker 32 for a period of time from t2 to t3, thereby to produce an alarm of before-five minutes to the tape end.

Explanation to follow is for a case where the tape speed is changed to 1.2 cm/s by means of the speed switch 36. Upon the switching of the tape speed, the clock pulse CK is changed from the CK1 to the CK2. It is assumed that the diameter of the tape wound is 14.2 mm before five minutes to the tape end at the tape speed of 1.2 cm/s. When the wound tape diameter is 14.2 mm at the tape speed 1.2 cm/s, the period T2 of the gate pulse P1 is about 0.027 second, i.e. $T2=14.2\pi/(12\times 10)\cong 0.37$ second. When the frequency of the clock pulse CK (=CK2) is 5.30 KHz and the period T2 is more than 370 ms, the count data is more than 1960, $(5300\times 0.37\cong 1960)$. In this case, since PD<CD, no trigger pulse P2 is produced. This corresponds to the state before time t1 shown in FIG. 2. When PD>CD at time t2, the trigger pulse P2 is produced, then the before-five-minute alarm is issued. If the clock pulse CK is not changed and CK=10 KHz at the tape speed 1.2 cm/s, the tape end alarm will be issued immediately before the tape end, or the tape end alarm will not be issued.

As described above, by changing the frequency of the clock pulse CK in accordance with the tape speed, the tape end is alarmed at a given timing, e.g. before five minutes to the tape end, independently of the tape speed.

FIG. 3 shows a modification of the device shown in FIG. 1. In the modification shown in FIG. 3, the transport direction of the tape 10 is opposite to that in the FIG. 1 embodiment. More specifically, the FIG. 3 embodiment does not detect the remnant of the tape taken up by the hub 14 and detect the amount of the tape taken up. The FIG. 3 embodiment can previously notify the immediate arrival of the tape end.

A first pulse, i.e. the gate pulse P1, derived from the collector of the phototransistor $18_2$ is applied to a retriggerable MMV 42. To the MMV 42 is applied either a first time constant Ts1 or a second time constant Ts2, by means of switches $36_1$ and $36_3$. If the pulse interval of the gate pulse P1 is shorter than a given value dependent on the time constant coupled with the circuit, the logical level of the output pulse P6 of the MMV 42 is "1". Conversely, when the pulse interval of the gate pulse P1 is longer than the given value, the logical level of the output pulse P6 is "0". After the logical level of the output pulse P6 is inverted, when the MMV 42 is retriggered by the gate pulse P1, the output pulse P6 is again to logical "1".

FIGS. 4A and 4B show how the level of the output pulse P6 is inverted. Before time t10, the pulse interval of the gate pulse P1 is shorter than the given value, so that the output pulse P6 remains logical "1". After time t10, the pulse interval of the gate pulse P1 becomes longer than the given value. At this time, the level of the output pulse P6 is inverted every time the time To elapses, which corresponds to the first time constant Ts1 or the second time constant Ts2. The output pulse P6 is supplied to the base of a PNP transistor 44. The transistor 44 is connected at the emitter to the power source Vcc and at the collector to a LED 46. When the output pulse P6 becomes logical "0", the transistor 44 is turned on and the LED 46 is lighted. After time t10, the LED 46 flashes with a period To. The time duration of the lighting of the LED 46, or the duration of the logical level "0" of the output pulse P6, becomes longer as the tape approaches to its end. Therefore, the construction shown in FIG. 3 is capable of giving a tape end alarm and displaying a change of the tape remnant, by the change of the lighting time of the LED 46.

The given value to determine the timing of the generation of the pulse P6 may be changed by switching the first time constant Ts1 and the second time constant Ts2. Therefore, by changing the tape speed through the operation of the speed change switch 36, the timing of the tape end alarm can be kept constant.

A missing-pulse detector using a timer IC model NE555 manufactured by TEXAS INSTRUMENTS INC., USA, for example, is suitable for the retriggerable MMV 42. This detector is described as an application in the catalog issued by the same company.

The descriptions relating to FIGS. 1 to 4 are not limited to the invention in any way. Various modifications and changes may be made without departing from the scope and spirit of the invention. For example, the alarm sound by the speaker 32 in the alarm means 35 may be replaced by flashing by a LED or the like. In this case, the frequency of the alarm pulse P4 is preferably several Hz. There are many other means to keep constant the timing of the tape end alarm irrespective of the tape speed, in addition to the above-mentioned one. To this end, the FIG. 1 embodiment changes the frequency of the clock pulse CK. One of the replacements of this is to change the preset data PD in accordance with the tape speed (FIG. 5). Another example is shown in FIG. 6 in which the gate pulse P1 is frequency divided and the load timing of the latch/comparator 20 or the reset timing of the counter 22 is changed.

An electromagnetic means is available for the means for generating the gate pulse P1. For example, a magnet is embedded at the place of the light-passing hole $16_1$ of the disc 16 and a Hall element or a lead switch, which is turned-on by the magnetic flux provided from the magnet, may be used in place of the phototransistor $18_2$. Alternatively, a dielectric disc 16 with an electret $16_1$ and a MOS transistor $18_2$ are used and the gate pulse P1 is formed depending on a charge-change induced into the gate region of the MOS transistor $18_2$. As another modification, an AC generator rotating coupled with the hub 14 is used and an emf. of the generator is used as the gate pulse P1.

Additionally, the switches $36_1$ to $36_4$ may be mechanical switches or electronic switches using the turn on and off of the transistor.

What is claim is:

1. An early tape end alarm system for a multispeed tape recorder for warning of the tape end a predetermined time before the tape end is reached, comprising:
    a hub around which a tape is wound and which revolves at a speed corresponding to an amount of tape wound therearound;
    a first pulse generating means for generating a first pulse with a period changing in accordance with the rotary speed of said hub;
    an alarm means including comparison means which compares a value corresponding to the period of the first pulse with a given value, and for generating a tape end alarm as a function of the result of said comparison to indicate that a traveling tape is approaching its tape end; and
    means for changing a condition in accordance with the tape traveling speed and for coupling said changed condition to said comparison means to provide the comparison result in the alarm means as a function of the tape traveling speed, for thereby determining the timing of the generation of the tape end alarm such that the tape end alarm is always generated a predetermined time before the tape end is reached, substantially independent of the traveling speed of the tape.

2. An early tape end alarm system according to claim 1, wherein:
    said alarm means includes a source of second pulses of given frequency, a counter for counting said second pulses for a period of time corresponding to the period of the first pulse, said comparison means includes a comparator which compares the count of said counter with the given value and which produces a third pulse when the count of the counter is above or below the given value, and an alarm circuit for generating an alarm signal as the tape end alarm when the third pulse is issued; and
    said changing means includes means for changing at least one of the period of the first pulse, the frequency of the second pulse and the given value in accordance with the tape traveling speed.

3. An early tape end alarm system according to claim 1, wherein:
    said alarm means comprises a second pulse generating means which includes means for comparing the pulse period of said first pulse with a time constant corresponding to the given value, and means for producing a fourth pulse to cause the generation of the tape end alarm when the pulse period is below or above an interval corresponding to the time constant; and
    said changing means includes means for changing the time constant in accordance with the tape traveling speed so that the fourth pulse is always generated a substantially constant period of time before the tape end.

4. An early tape end alarm system for a multispeed tape recorder for warning of the tape end a predetermined time before the tape end is reached, comprising:
    a hub around which a tape is wound and which revolves at a speed corresponding to an amount of tape wound therearound;
    pulse generating means for generating a first pulse with a period changing in accordance with the rotary speed of said hub;
    a source of second pulses of given frequency;
    a counter for counting said second pulses during a time duration corresponding to the period of the first pulse;
    a comparator coupled to said counter for comparing the count of said counter with a given value and for producing a third pulse when the count of said counter is above or below the given value;
    an alarm circuit coupled to said comparator and responsive to said third pulse for producing an alarm signal to indicate that a traveling tape is approaching its tape end when the third pulse is produced;
    means coupled to said alarm circuit for producing an alarm to notify that the traveling tape is approaching its tape end on the basis of the alarm signal; and
    means coupled to said second pulse source for changing the frequency of the second pulses as a function of the tape traveling speed for thereby determining the timing of the generation of the alarm signal such that the alarm signal and the alarm are always generated a predetermined time before the tape end is reached, substantially independent of the tape traveling speed.

5. An early tape end alarm system for a multispeed tape recorder for warning of the tape end a predetermined time before the tape end is reached, comprising:

a hub around which a tape is wound and which revolves at a speed corresponding to an amount of tape wound therearound;

pulse generating means for generating a first pulse with a period changing in accordance with the rotary speed of said hub;

a source of second pulses of given frequency;

a counter for counting said second pulses during a time duration corresponding to the period of said first pulse;

a comparator coupled to said counter for comparing the count of said counter with a given value and for producing a third pulse when the count of said counter is above or below the given value;

an alarm circuit coupled to said comparator and responsive to said third pulse for producing an alarm signal to indicate that a traveling tape is approaching its tape end when the third pulse is produced;

means coupled to said alarm circuit for producing an alarm to notify that the traveling tape is approaching its tape end on the basis of the alarm signal; and means for changing said given value as a function of the tape traveling speed for thereby determining the timing of the generation of the alarm signal such that the alarm signal and the alarm are always generated a predetermined time before the tape end is reached, substantially independent of the tape traveling speed.

6. An early tape end alarm system for a multispeed tape recorder for warning of the tape end a predetermined time before the tape end is reached, comprising:

a hub around which a tape is wound and which revolves at a speed corresponding to an amount of tape wound therearound;

pulse generating means for generating a first pulse with a period changing in accordance with the rotary speed of said hub;

a source of second pulses of a given frequency;

a counter for counting said second pulses during a time duration corresponding to the period of said first pulse;

a comparator coupled to said counter for comparing the count of said counter with a given value and for producing a third pulse when the count of said counter is above or below the given value;

an alarm circuit coupled to said comparator and responsive to said third pulse for producing an alarm signal to indicate that a traveling tape is approaching its tape end when the third pulse is produced;

means coupled to said alarm circuit for producing an alarm to notify that the traveling tape is approaching its tape end on the basis of the alarm signal; and means for changing the period of said first pulse as a function of the tape traveling speed for thereby determining the timing of the generation of the alarm signal such that the alarm signal and the alarm are always generated a predetermined time before the tape end is reached, substantially independent of the tape traveling speed.

7. An early tape end alarm system for a multispeed tape recorder for warning of the tape end a predetermined time before the tape end is reached, comprising:

a hub around which a tape is wound and which revolves at a speed corresponding to an amount of tape wound therearound;

first pulse generating means for generating a first pulse with a period changing in accordance with the rotary speed of said hub;

second pulse generating means coupled to said first pulse generating means and including means for comparing the pulse period of said first pulse with a given time constant, and means for producing an alarm pulse to cause the issuance of an alarm when the pulse period of said first pulse is above or below an interval corresponding to the time constant;

means coupled to said second pulse generating means and responsive to said alarm pulse for producing an alarm to indicate that a traveling tape is approaching its tape end on the basis of the alarm pulse; and means for changing said time constant as a function of the tape traveling speed so that the timing of the generation of the alarm pulse is in accordance with the tape traveling speed such that said alarm and said alarm pulse are generated a predetermined time before the tape end is reached, substantially independent of the tape traveling speed.

8. An early tape end alarm system according to claim 3 or 7, wherein said second pulse generating means includes a monostable multivibrator which is repetitively triggered by said first pulse.

9. An early tape end alarm system according to any one of claims 2, 4, 5 or 6, wherein said second pulses have pulse period which are less than the period of said first pulse.

* * * * *